United States Patent
MacFarlane et al.

(10) Patent No.: US 6,575,156 B2
(45) Date of Patent: Jun. 10, 2003

(54) BATTERY WARMER

(75) Inventors: Jeanine Marie MacFarlane, Lithonia, GA (US); Elizabeth Anne Taylor, Atlanta, GA (US)

(73) Assignee: Motorola, Inc., Schaumburg, IL (US)

( * ) Notice: Subject to any disclaimer, the term of this patent is extended or adjusted under 35 U.S.C. 154(b) by 19 days.

(21) Appl. No.: 09/827,044

(22) Filed: Apr. 5, 2001

(65) Prior Publication Data

US 2002/0144677 A1 Oct. 10, 2002

(51) Int. Cl.$^7$ .............................. F24J 1/00; H01M 10/50
(52) U.S. Cl. ................... 126/263.01; 126/204; 429/120
(58) Field of Search .......... 126/263.01, 263.05–263.09, 126/204, 206; 607/112, 114; 206/207; 429/120

(56) References Cited

U.S. PATENT DOCUMENTS

| | | | | |
|---|---|---|---|---|
| 2,615,933 A | * | 10/1952 | Carlson et al. | 429/120 |
| 3,156,813 A | * | 11/1964 | Trainor | 219/526 |
| 3,301,250 A | * | 1/1967 | Glasser | 126/263.02 |
| 3,762,393 A | * | 10/1973 | O'Hare | 126/263.09 |
| 3,893,834 A | * | 7/1975 | Armstrong | 607/114 |
| 4,095,938 A | * | 6/1978 | Mikaila | 429/120 |
| 4,605,006 A | * | 8/1986 | Jacques | 607/113 |
| 5,230,333 A | * | 7/1993 | Yates et al. | 2/239 |
| 5,429,115 A | * | 7/1995 | Tan et al. | 126/263.01 |
| 5,834,131 A | * | 11/1998 | Lutz et al. | 429/7 |
| 6,168,613 B1 | * | 1/2001 | Besse | 607/114 |

FOREIGN PATENT DOCUMENTS

| JP | 5-176951 A | * | 7/1993 | 126/204 |
|---|---|---|---|---|
| JP | 11-354167 A | * | 12/1999 | |

* cited by examiner

*Primary Examiner*—Henry Bennett
*Assistant Examiner*—James G. Barrow
(74) *Attorney, Agent, or Firm*—Philip H. Burrus, IV

(57) ABSTRACT

An apparatus for warming a battery for a personal electronic device includes a heating element and a holder. The holder holds the heating element adjacent to the battery for the personal electronic device so as to apply heat thereto. Exemplary heating means include supersaturated solutions and ferrous materials. The invention allows the user to operate a portable electronic device in environments that would otherwise be prohibitory due to the temperature operating limitations of the battery.

2 Claims, 1 Drawing Sheet

BATTERY WARMER

BACKGROUND

1. Technical Field

This invention relates generally to personal electronic devices, and more specifically, to an apparatus for warming a battery for a personal electronic device.

2. Background Art

Personal electronic devices are widely used in today's information age. Cellular telephones, two-way radios, pagers, personal data assistants, calculators, and voice recorders/players, are only some of the devices commonly used by people to stay organized and informed. Many individuals carry such devices wherever they go, outdoors as well as indoors.

Batteries for these devices tend to be temperature sensitive and may experience a shortened life span or may completely fail when exposed to cold temperatures due to the limits of current cell chemistry technology. Some users of personal electronic devices desire to use such devices in severe cold weather (e.g., while doing research in Antarctica) where sub-zero temperatures are common. However, most current lithium-ion batteries have a near zero charge time when exposed to sub-zero temperatures. Therefore, there is a need for an apparatus which keeps batteries warm in cold conditions.

DETAILED DESCRIPTION OF THE INVENTION

Figure 1:
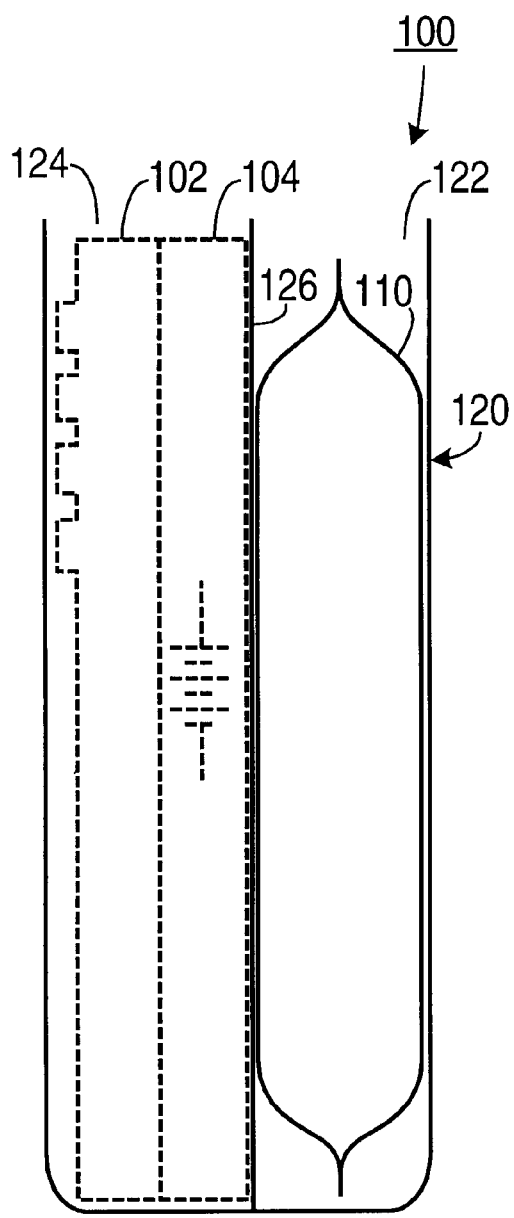
FIG. 1 is a side cross-sectional view of a first illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

FIG. 1 shows a first embodiment of the invention, which is a battery warmer 100 for a personal electronic device 102 that is powered by a battery 104. A heating element 110 is held adjacent to the battery 104 by an envelope 120 (which may include heat insulation). The personal electronic device 102 and battery 104 are held in a first portion 124 of the envelope 120 and the heating element 110 is held in the second portion 122 of the envelope 120. A divider 126 separates the first portion 124 and the second portion 122. Once activated, the heating element 110 applies heat to the battery 104. In one embodiment of the invention the heating element 110 is a chemically activated device, such as a hand warmer of the type commonly available at most outdoors sports outfitting stores. Typically, such hand warmers begin generating heat as a result of an exothermic reaction that is initiated by pressing a button or by other physical manipulation of the heating element.

Figure 2:
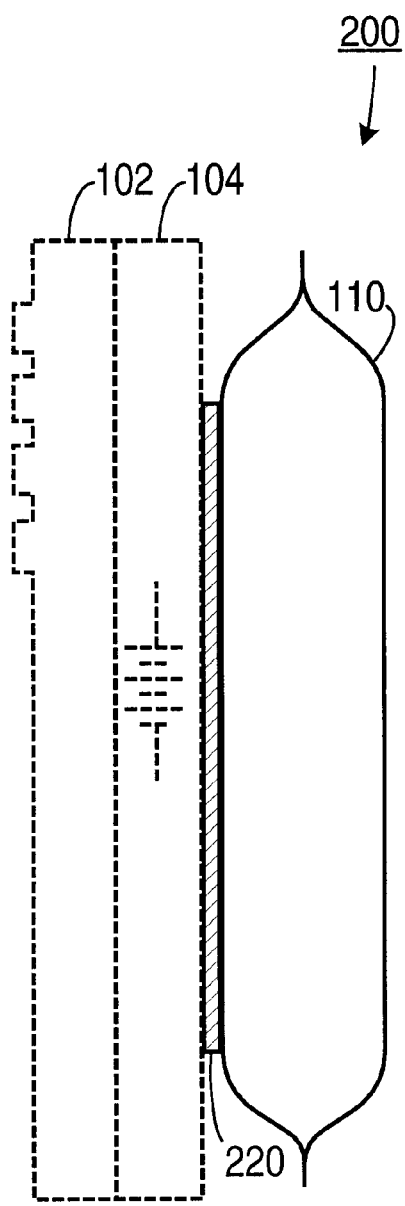
FIG. 2 is a side cross-sectional view of a second illustrative embodiment of the invention.

FIG. 2 shows a second embodiment of the invention in which the battery warmer 200 includes a heating element 110 that is held adjacent to the battery 104 of the personal electronic device 102 by a conductive adhesive 220 (such as a piece of two-sided tape) rather than by an envelope. This embodiment is simpler that the envelope embodiment, but may apply a lower percentage of the heat generated by the heating element 110 to the battery 104.

Means appropriate for heating devices include supersaturated solutions and ferrous materials. Supersaturated devices generally are in supersaturated state that keeps the material in a liquid form below the freezing point. When a small crystal is inserted into the supersaturated solution, the material freezes at a high temperature. This technology is currently known in the art as it is used in hand warming devices available in sporting goods stores.

An alternative heating means includes ferrous material. When the ferrous material is exposed to the air, perhaps by shaking, the iron in the ferrous material oxidizes. The oxidation generates heat. This is another means that may be used in accordance with the invention.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while heating means have been described as supersaturated solutions and ferrous materials, it will be obvious to those skilled in the art that numerous other equivalent heating means could be used as well.

What is claimed is:

1. An apparatus for warming a battery for a personal electronic device, comprising:
   a. a heating element; and
   b. a holder that holds the heating element adjacent to the battery for the personal electronic device so as to apply heat thereto;
   wherein the holder comprises an envelope defining a first portion capable of receiving the personal electronic device therein and a second portion, adjacent to the first portion, separated from the first portion by a solid divider, the second portion capable of receiving the heating element therein.

2. The apparatus of claim 1 wherein the heating element is capable of generating heat as a result of a chemical reaction that is initiated by a method selected from the group consisting of pressing a button or physical manipulation of the heating element.

* * * * *